United States Patent Office 2,922,873
Patented Jan. 26, 1960

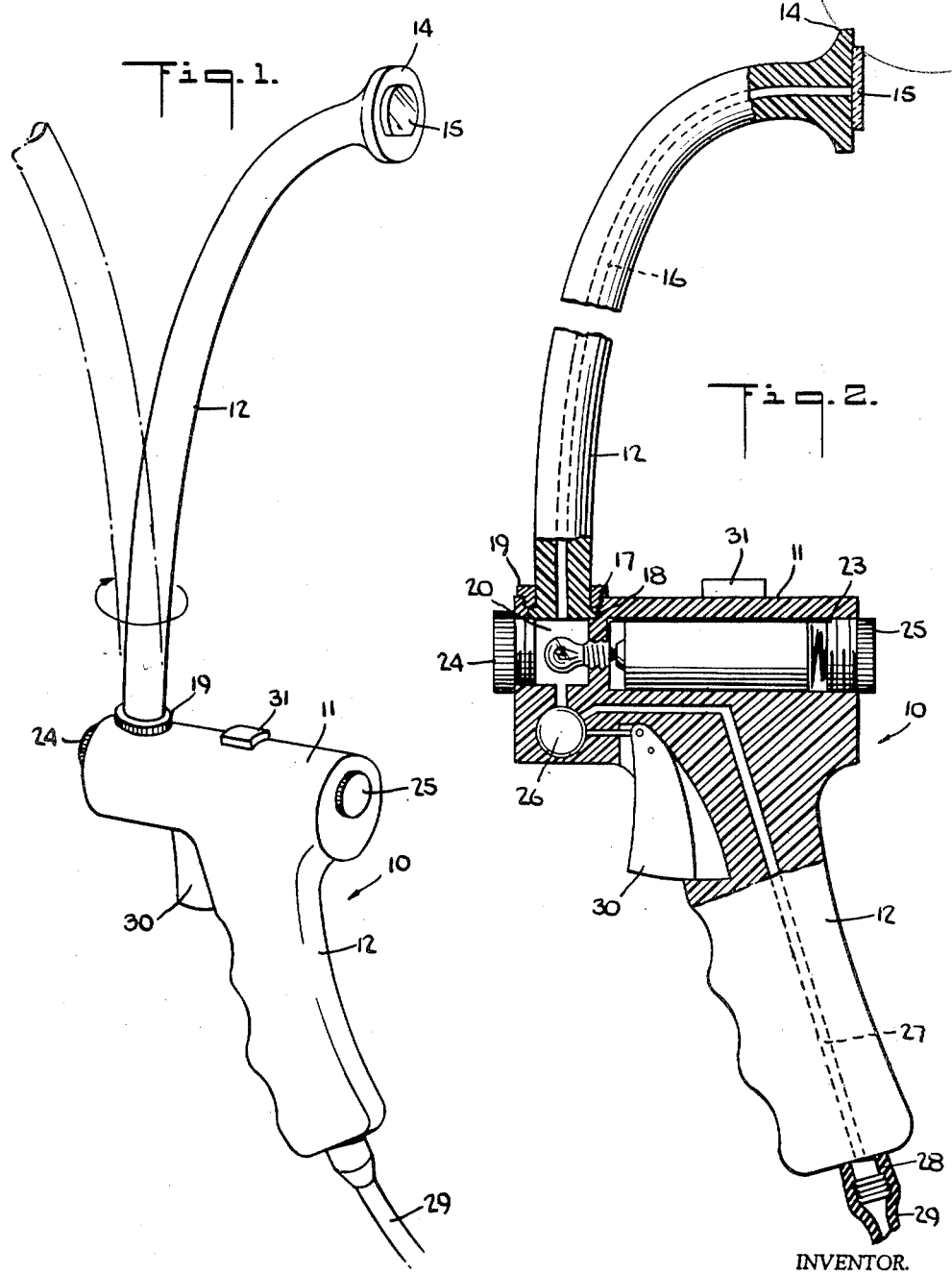

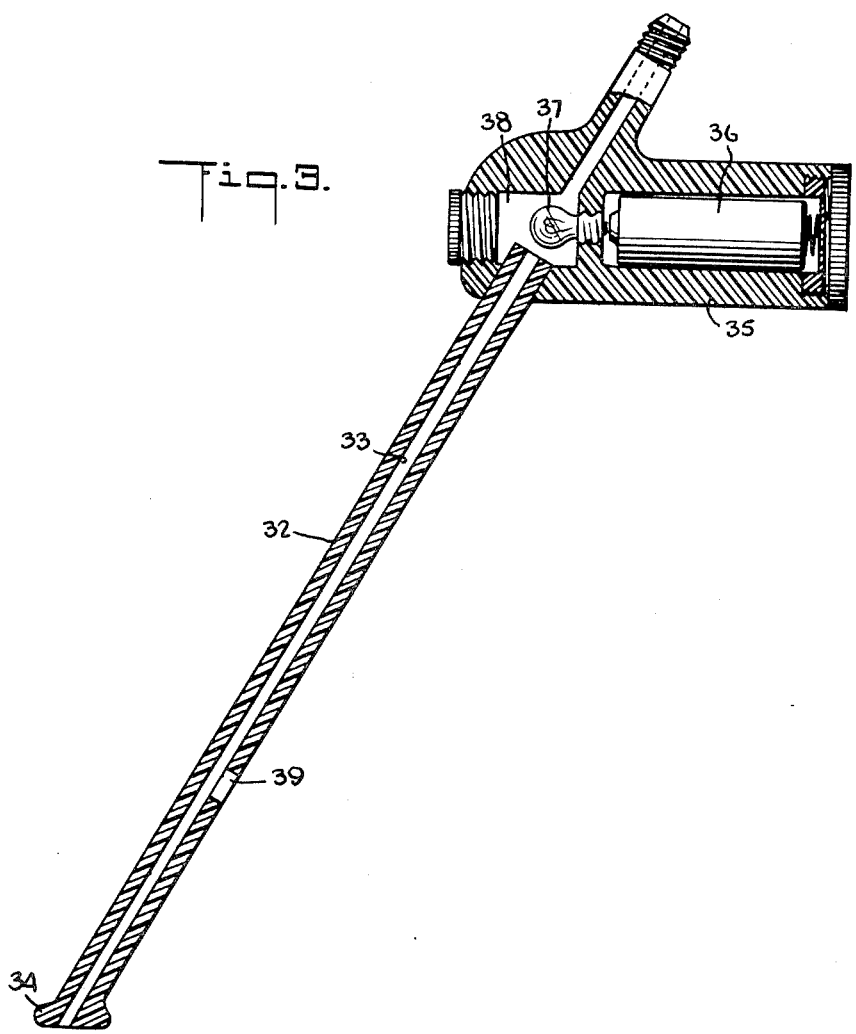

2,922,873
ILLUMINATED INSPECTION PROBE FOR SMALL OBJECTS

Robert J. Bibbero, New York, and Abe Mann, Uniondale, N.Y., assignors to Bulova Research and Development Laboratories, Inc., Woodside, N.Y., a corporation of New York Application June 26, 1958, Serial No. 744,833

4 Claims. (Cl. 240—2.18)

The present invention relates generally to instruments for manipulating and inspecting light-permeable objects of small size, and more particularly to a releasable vacuum probe adapted to pick up and illuminate quartz-crystal blanks and the like.

In the manufacture of glass and plastic lenses or optical filters, quartz crystal resonators, microscope cover glasses and other light-permeable articles which are small and thin, difficulty is experienced in those operations involving handling and inspection. Such articles are normally fragile and may have clean or polished surfaces which should not be touched. Thus a special gripping tool is necessary to enable an operator to pick up and manipulate the article as desired. Inspection may also be required in order to sort the articles into good and bad lots by reason of possible defects, such as chips, cracks and scratches. Such defects are usually detected visually by passing light through the object.

For purposes of handling, it has been known heretofore to make use of hollow probes connected to a vacuum source. Such probes may be used to pick up a small article and to place the article on an illuminated translucent plate for inspection. Upon completion of inspection, the article is again picked up by the vacuum probe and deposited into an appropriate bin, depending on the results of the inspection. Thus, three distinct operations or steps are entailed; namely, (a) initial pick-up, (b) placement of the object on an illuminated inspection plate for visual examination, and (c) removal of the object from the plate for deposit in an appropriate sorting bin.

In view of the foregoing, it is the primary object of this invention to provide a releasable vacuum probe which is adapted to combine the functions of pick-up and examination, thereby achieving a substantial saving in time and eliminating useless motion.

More particularly, it is an object of the invention to provide a vacuum probe formed of light transmitting material and terminating in a relatively flat pick-up head whose area at least encompasses the area of the article to be handled and inspected, the head being illuminated to facilitate inspection of the article. Thus inspection is made directly on the head, and upon completion of inspection, the article may be deposited without further manipulation. Where the article in question is being fabricated by mass production techniques, the probe in accordance with the invention will substantially reduce inspection and sorting costs.

More particularly, it is an object of the invention to provide a vacuum inspection probe whereby an object may be picked up simply by touching it with the probe, the object thereafter being released by pressing a valve button.

Briefly stated, these objects are accomplished in a probe structure comprising a handle from which projects a hollow light-transmitting rod terminating in an enlarged head having a vacuum opening, the head being so formed that when it engages the article, it seals off the opening. The portion of the rod held within the handle comunicates with a well therein containing a light source, the rays being transmitted by the rod to the inspection head. The well also connects to a normally open valve on the handle which leads through a suitable tube to a vacuum source, the valve being closed by means of a pressure actuator which may be readily manipulated to cut off suction and release the article from the head.

For a better understanding of the invention as well as other objects and further features thereof, reference is had to the following detailed description to be read in conjunction with the accompanying drawings, wherein like components in the various views are identified by like reference numerals.

In the drawing:

Fig. 1 is a perspective view of a probe structure in accordance with the invention.

Fig. 2 is a longitudinal section taken through the probe structure.

Fig. 3 is a sectional view of a modified probe structure.

Referring now to the drawing, the vacuum probe mainly comprises a handle 10 having a barrel portion 11 and a grip portion 12, and a probe 13 which extends upwardly from the handle and terminates in a flat faced head portion 14. An article to be handled and inspected is represented by a thin quartz crystal wafer 15 having a generally circular shape.

Probe 13 is formed of a light transmitting tubular material, such as "Lucite," having a central bore 16, the probe having a curvature such that the face of the head lies in a vertical plane when the handle is held in the position shown in the figures. The lower end of probe 12 is provided with an annular flange 17 which is held by means of a threaded ring 19 within a circular recess 18 formed in the wall of the barrel portion 11, the probe being free to rotate within the recess whereby the position of the head may be manually adjusted as desired.

Formed in barrel 11 below the recess 18 is a well 20 which contains an electric light bulb 21 of flashlight size, the bulb being energized by a battery 22 housed in a compartment 23 within the barrel. A switch 31 of any conventional design may be used to operate the lamp. Access to the well 20 is had by means of a removable screw 24 at the front end of the barrel and access to the battery compartment 23 is had by means of a removable screw 25 at the rear end. It will be understood that in lieu of battery operation, a power line cord may be provided to energize the lamp.

The lower end of bore 16 in probe 12 communicates with well 20 which in turn is coupled through a suitable valve 26, housed within the barrel, to a duct 27 passing through the grip portion 12 and terminating in a pipe coupler 28 projected from the lower end of the grip. Pipe coupler 28 serves to couple the probe to a vacuum pump (not shown) by means of a flexible tube 29.

Valve 26 is normally open whereby a vacuum is drawn through the probe 16. The vacuum path may be blocked by closing valve 26, this being accomplished by means of a trigger element 30 pivotally mounted on the grip and pivotally connected to the actuating plunger 31 for the valve whereby when the trigger is pulled the valve is caused to close.

It is to be understood that in place of a handle grip and trigger arrangement the handle may take other forms, such as a cylindrical casing provided with an exterior button to operate the valve.

In use the operator selects and picks up an object by touching it with the probe head 14 to which the object, say crystal 15, adheres by virtue of the vacuum. In order to produce this effect for a flat object, such as crystal 15, the head is preferably formed with a flat face to conform to the surface of the object. But for objects such as lenses having curved surfaces, the head may be formed with a complementary curvature. In any event the area of the face should exceed the area of the object to be manipulated.

Since the entire face of the head is illuminated, the light therefrom passes through the light permeable object, thereby facilitating inspection without removal from the head. When inspection is completed, the valve trigger is pressed to cut off the vacuum and clear the head for the next operation.

Referring now to Fig. 3, there is shown a modified form of probe whereby the vacuum probe may be held in the hand like a pencil, no handle being provided as in the previous embodiment. The vacuum probe includes a straight line light transmitting tube 32 having a central bore 33, the lower end terminating in a head portion 34 adapted to engage an article to be handled and inspected.

Attached to the upper end of the tube 32 is a casing 35 in which is installed a battery 36 and a light bulb 37 energized thereby. The bulb is mounted within a chamber 38 communicating with the bore in the probe tube, whereby light rays are transmitted through the tube to the head to illuminate same. The chamber 38 is connected to a vacuum source through a duct 39 formed in the casing 35.

In lieu of a valve in the vacuum system, a transverse hole 39 is formed in the tube 32 which the operator who grips the probe is able to close and open by his thumb, thereby releasing the vacuum and making it effective as desired to pick up or drop an article.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An inspection probe comprising a light transmitting probe element having a passage extending therethrough and terminating in an inspection head, a handle for supporting said probe and provided with a well communicating with said passage, a light bulb in said well to produce rays transmitted through said probe to said head to illuminate same for inspection purposes, a battery compartment in said handle to supply energy to said bulb, and a normally open valve coupling said well to a vacuum source whereby objects are caused to adhere to said head when contact is made therewith, said objects being released upon closure of said valve.

2. A probe for inspecting and handling light permeable articles comprising a probe element terminating at one end in a head and having a passage extending therethrough, a handle secured to the other end of said element, a well formed in said handle and communicating with the passage in said probe element, a light bulb positioned within said well to produce rays transmitted by said probe element to said head to provide an illuminated inspection surface, a normally-open valve supported within said handle and having an exterior actuating member, duct means connecting said well through said valve to a vacuum source, whereby objects contacting said head are held thereto by suction and are released therefrom by operating said member.

3. A probe for inspecting and handling light permeable articles comprising a probe element terminating at one end in a flat faced head and having a passage extending therethrough, said probe element being curved to orient said head vertically, a handle secured to the other end of said element, a well formed in said handle and communicating with the passage in said probe element, a light bulb positioned within said well to produce rays transmitted by said probe element to said head to provide an illuminated inspection surface, a normally-open valve supported within said handle and having an exterior actuating member, duct means connecting said well through said valve to a vacuum source, whereby objects contacting said head are held thereto by suction and are released therefrom by operating said member.

4. A probe for inspecting and handling light permeable articles comprising a "Lucite" probe element terminating at one end in a flat faced head and having a passage extending therethrough, a handle secured to the other end of said element, a well formed in said handle and communicating with the passage in said probe element, a light bulb positioned within said well to produce rays transmitted by said probe element to said head to provide an illuminated inspection surface, a battery compartment for supply power to said bulb, a normally-open valve supported within said handle and having an exterior actuating button, duct means connecting said well through said valve to a vacuum source, whereby objects contacting said head are held thereto by suction and are released therefrom by operating said button.

References Cited in the file of this patent

UNITED STATES PATENTS

| | | |
|---|---|---|
| 1,987,336 | Powell | Jan. 8, 1935 |
| 2,813,968 | Wood | Nov. 19, 1957 |